United States Patent [19]

Johnston

[11] Patent Number: 5,165,440

[45] Date of Patent: Nov. 24, 1992

[54] PROCESS AND APPARATUS FOR BLENDING VISCOUS POLYMERS IN SOLVENT

[75] Inventor: Ray L. Johnston, Ponca City, Okla.

[73] Assignee: Conoco Inc., Ponca City, Okla.

[21] Appl. No.: 816,012

[22] Filed: Dec. 30, 1991

[51] Int. Cl.$^5$ .............................................. F17D 1/16
[52] U.S. Cl. ............................................ 137/13; 137/896
[58] Field of Search ............... 137/13, 896; 366/336, 366/341

[56] References Cited

U.S. PATENT DOCUMENTS

| | | | |
|---|---|---|---|
| 3,582,050 | 6/1971 | Kozak | 137/13 X |
| 3,826,279 | 7/1974 | Verschuur | 137/13 X |
| 3,886,972 | 6/1975 | Scott | 137/13 X |
| 4,422,830 | 12/1983 | Perkins | 417/54 |
| 4,688,589 | 8/1987 | Brainerd | 137/13 |
| 4,722,363 | 2/1988 | Allyn | 137/13 X |
| 4,756,326 | 7/1988 | Johnston | 137/13 |
| 4,771,799 | 9/1988 | Baxter | 137/13 |
| 4,771,800 | 9/1988 | Pomeroy | 137/13 |
| 5,067,508 | 11/1991 | Lee | 137/13 |

Primary Examiner—Alan Cohan

[57] ABSTRACT

A viscous polymer is passed through a filament or thread forming apparatus and introduced into a flowing solvent. The polymer containing solvent is then passed through a shear strain apparatus where the polymer not formed into filaments or threads is formed into long fibers and the solvent and polymer are thoroughly blended. The polymer and solvent leaving the shear strain apparatus may be introduced into a holding apparatus wherein the polymer and solvent are retained until the polymer has gelled.

17 Claims, 3 Drawing Sheets

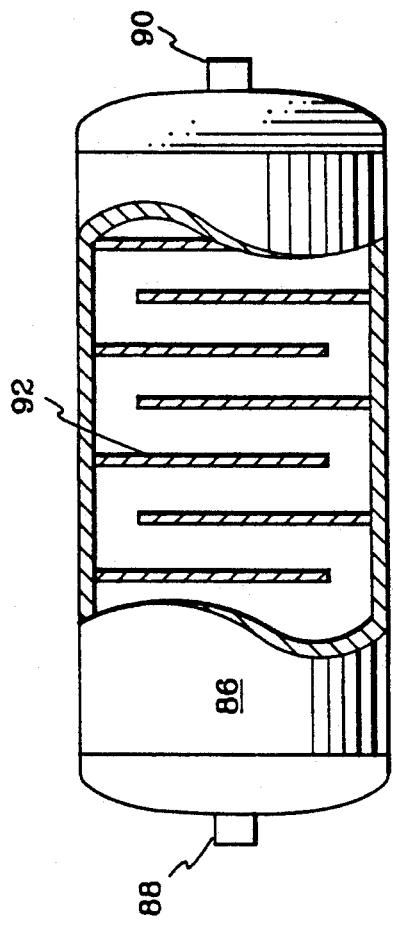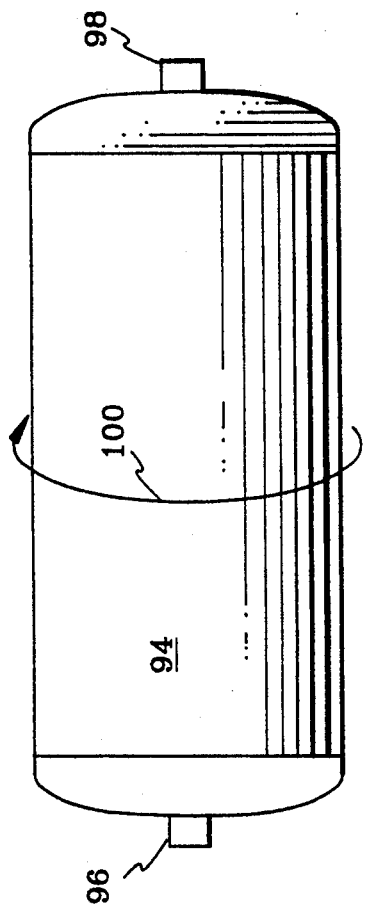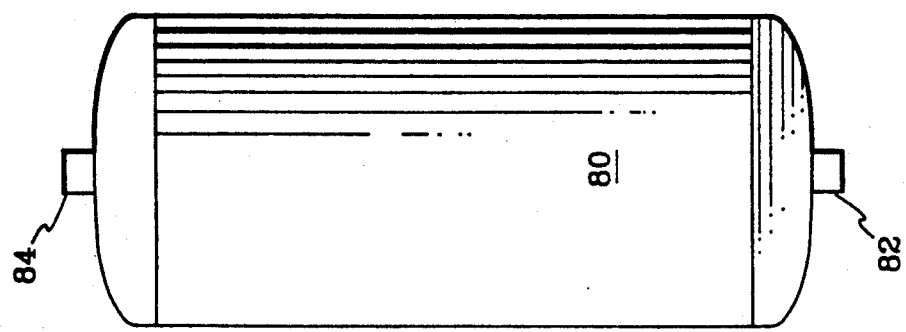

PROCESS AND APPARATUS FOR BLENDING VISCOUS POLYMERS IN SOLVENT

BACKGROUND OF THE INVENTION

Drag reduction of hydrocarbon fluids flowing through conduits is known. An example of such an operation is described in U.S. Pat. No. 3,626,676 which provides a method by which the percent drag reduction can be measured. The reference describes inserting the drag reducing additives as a polymeric liquid. Other representative art in the area includes U.S. Pat. No. 3,736,288 in which various drag reducing formulations are added to exhibit a staggered dissolving or controlled dissolving characteristic using varying molecular weight fractions and/or particle sizes. These materials are added as polymeric solids. The reference also discloses pumpability, pourability, stratification resistance and the like of these solutions. U.S. Pat. No. 3,601,079 describes a water-soluble, polymeric material mixed with water in a mixing chamber prior to injection into a pipeline. U.S. Pat. No. 3,884,252 describes a process for reducing oxidative degradation and cold flow of polymer crumb by immersing the crumb in a non-solvent and then dusting prior to injecting the polymer crumb or slurry of polymer crumb and water into a hydrocarbon fluid and allowing the crumb to gradually and continuously dissolve throughout the pipeline. Injection of friction reducing polymers is also described in U.S. Pat. No. 4,263,929. A drag reducing dispersing metering system is described in U.S. Pat. No. 3,900,034.

There also exists a group of art relating to a method for dissolving polymers in solvent. This art does not specifically mention pipelining of fluids. This area of art is represented by U.S. Pat. Nos. 2,639,275; 3,468,322; 3,891,593 and 4,537,513. These patents all deal with methods for dissolving a fixed amount of polymer in a fixed amount of solvent, utilizing recycling or dissolving means. However, such methods of dissolving polymer require extra apparatus and it would be highly preferable to directly inject drag reducing agents into a pipeline.

The performance of drag reducing additives is highly dependent upon the dissolution of these additives in the flowing liquid. Addition of solid materials to a pipeline and allowing dissolution as the material travels to the pipeline has not been found to be an effective means of promoting drag reduction, since the materials are not dissolved at the time during which they are needed to provide drag reducing effects. It has been found preferable to inject the materials in a dissolved state or in a highly viscous concentrate in order to promote drag reduction by the dissolution of the polymer.

It would therefore be of great benefit to provide a method and apparatus whereby viscous high molecular weight drag reducing polymers can be introduced into fluids flowing through conduits in a manner to increase the performance of the drag reducing material.

PRIOR ART

U.S. Pat. No. 4,422,830 to Perkins, teaches that pump performance is enhanced when pumping a viscous chemical liquid by simultaneously pumping a compatible low viscosity liquid into the suction side of the injection pump. The low viscosity liquid acts as a lubricant and also assists in the dissolution or dispersion of the additive in the fluid flowing through a pipeline.

U.S. Pat. No. 4,688,589 to Brainerd et al discloses a process in which a drag reducer is introduced to flowing hydrocarbon through a probe installed in a pipeline with openings facing downstream and located away from the centerline of the pipeline.

U.S. Pat. No. 4,722,363 to Allyn discloses a process in which a drag reducer is educted into flowing hydrocarbon in a pipeline. The educted drag reducer is introduced to the pipeline through a donut shaped manifold surrounding the pipeline and opening to the pipeline through a number of injection conduits spaced around the surface of the manifold facing the pipeline.

U.S. Pat. No. 4,756,326 to Johnston discloses introducing a drag reducer to a conduit containing flowing liquid through land-length dies having multiple openings. Each opening preferably is approximately at equal distance from the conduit wall.

U.S. Pat. No. 4,771,799 to Baxter et al discloses introducing drag reducer into hydrocarbon fluids flowing through a conduit through dies having multiple orifices no larger than 2 millimeters in diameter.

U.S. Pat. No. 4,771,800 to Pomeroy discloses the introduction of a drag reducer into a flowing hydrocarbon through dies having multiple openings where the die openings are located substantially at the injection end of the die.

THE INVENTION

In the process and apparatus of the invention a viscous polymer (a) is passed through a filament or a thread forming means and is introduced into a flowing solvent, (b) the polymer containing solvent is passed into a shear strain means where polymer not formed into filaments or threads is formed into long fibers and the solvent and polymer are thoroughly blended.

In one aspect of the invention the viscous polymer is a drag reducer and is introduced to a flowing hydrocarbon stream to reduce pressure drop.

In another aspect of the invention, the polymer and solvent leaving the shear strain means is introduced to a holding means wherein the polymer and solvent is retained until the polymer has gelled. After gelling the polymer may be stored until such time as is it ready for use.

Various other aspects of the invention relate to specific apparatus employed to obtain the desired polymer-solvent product.

THE DRAWINGS

FIGS. 4A, 4B, and 4C illustrate various embodiments of holding apparatus.

DETAILED DESCRIPTION OF THE INVENTION

While the process and apparatus of the invention may be used with any viscous polymers, particular application is found in systems where viscous oil soluble drag reducers are used to reduce friction in hydrocarbon fluids flowing through pipelines or other conduits. Oil soluble drag reducers which may be used include, but are not limited to such materials as polyisobutylene, polyacrylates, polystyrene derivatives, polydimethylsiloxane, polyisopreme, polybutadiene, cyclopentene polymers and copolymers of cyclopentene with other ethylenically unsaturated hydrocarbons such as isobutene, octene, butadiene and isoprene. Particularly desirable drag reducers are high molecular weight non-crystalline hydrocarbon soluble polyolefin homopolymers and copolymers in which the olefin monomers may contain from 2 to 30 carbon atoms. All of the various drag reducing materials and their methods of preparation are well known in the art. For example, U.S. Pat. No. 4,493,903 to Mack discloses a method for producing ultra high molecular weight oil soluble non-crystalline polymers of alpha-olefins.

The drag reducers may have molecular weights ranging from 250,000 to as high as 5 to 10 million or higher. Usually more effective drag reduction is obtained with higher molecular weight materials. Polyolefin drag reducers preferably have an inherent viscosity of about 9 to about 18 deciliters/gm which equates to a molecular weight of about $1 \times 10^6$ to about $30 \times 10^6$.

The solvents employed with the oil soluble drag reducers are nonpolar and are miscible with such drag reducers. Examples of such nonpolar materials are generally the organic solvents, including such materials as saturated and unsaturated hydrocarbons, as for example, hexane, benzene, and mixtures thereof; liquified petroleum gases; gasoline; diesel oil and kerosine. It is also within the scope of the invention to use as the solvent a portion of the hydrocarbon stream to which the drag reducer is added for friction reduction.

The amount of solvent used with the drag reducer will vary depending on the particular polymer employed and the specific solvent used. Ordinarily, the polymer solvent blend will contain from about 1 to about 50 percent weight drag reducer, preferably from about 10 to about 20 percent.

Figure 1:
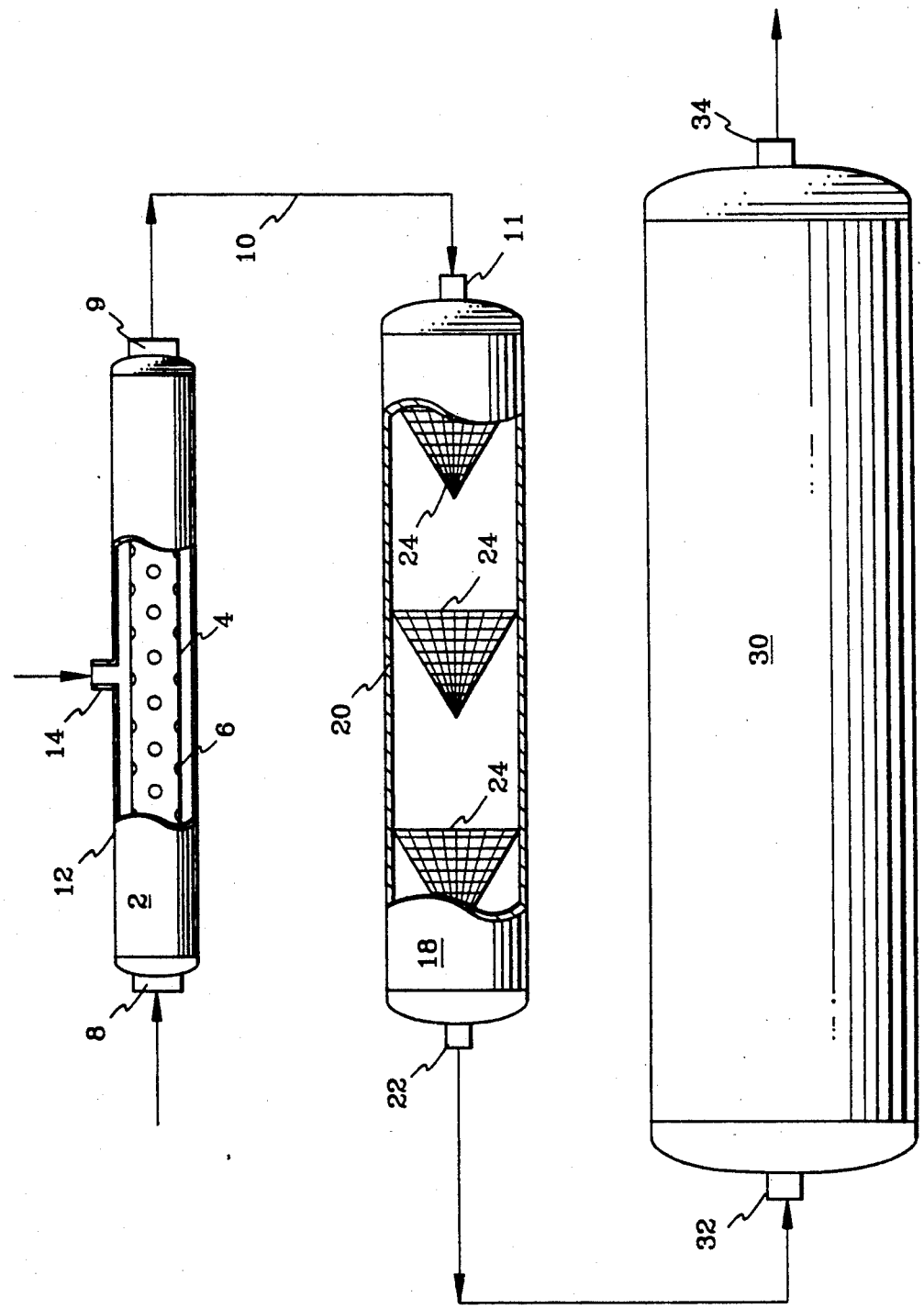
FIG. 1 is a schematic drawing of an apparatus for forming polymer filaments and threads, apparatus for providing shear strings and a holding apparatus.

The invention is best described in a preferred embodiment by reference to the drawings. FIG. 1 shows a polymer filament or thread producing apparatus 2 which comprises an inner pipe 4 perforated with a number of holes 6 and wrapped with a very fine wire mesh (not shown) an outer pipe 12 covers the perforated portion of inner pipe 4 to provide an annulus between the two pipes. An inlet 8 is provided in pipe 4 for the introduction of solvent and an inlet 14 is provided in outer pipe 12 for the introduction of viscous polymer.

Solvent containing polymer exits from apparatus 2 through outlet 9, via line 10 into inlet 11 of a shear strain apparatus 18. This apparatus which is comprised of pipe 20 which is of substantially greater cross section than pipe 4. Pipe 20 contains a plurality of cone-shaped screens containing relatively large openings. The mixture of viscous polymer and solvent passes through screens 24 exiting the shear strain apparatus through outlet 22. The mixture of viscous polymer and solvent then enters holding tank 30 through line 32. Holding tank 30 is sized to provide a substantial holding time for the polymer and solvent mixture. Eventually, the mixture of solvent and polymer (now in the form of a low viscosity gel) leaves the holding tank through outlet 34.

Figure 2:
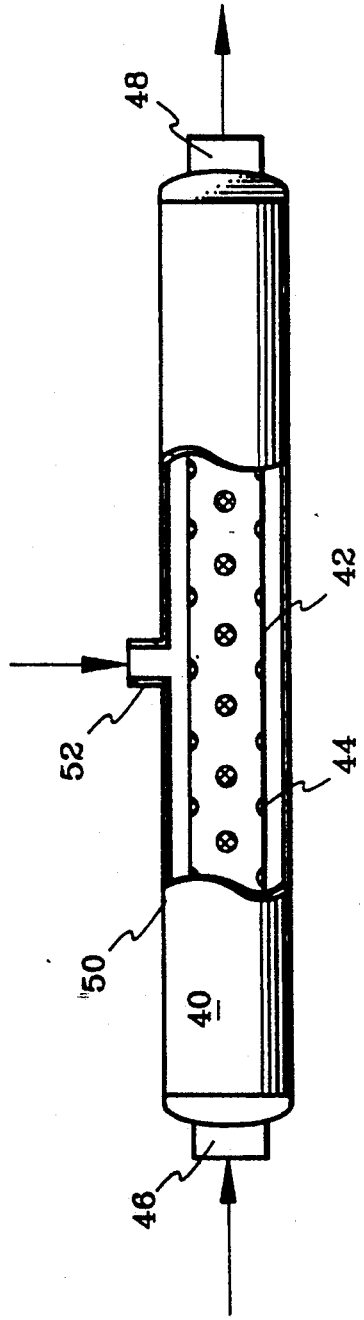
FIG. 2 is a more detailed schematic drawing of apparatus for forming polymer filaments and threads.
Figure 3:
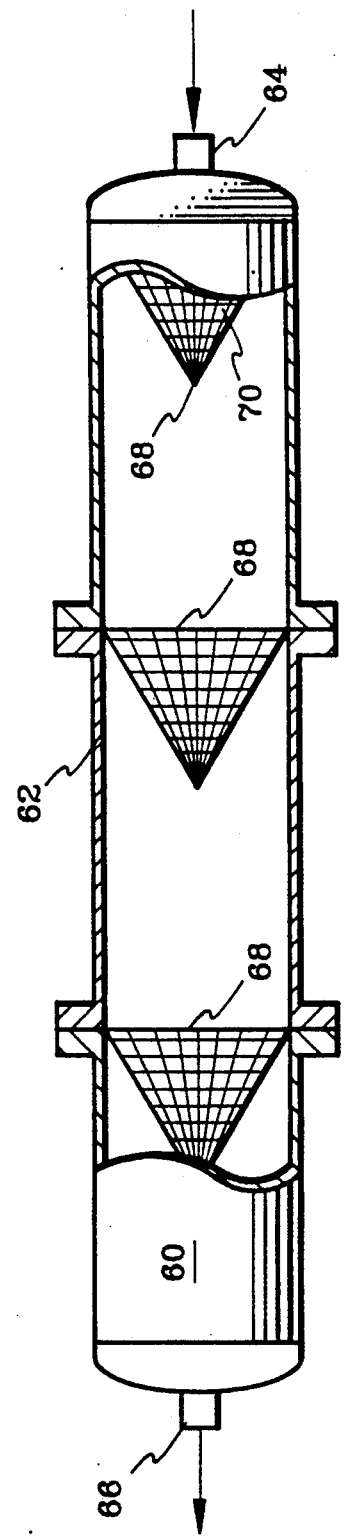
FIG. 3 is a more detailed schematic drawings of an apparatus for providing shear strain.

Referring now to FIGS. 2, 3 and 4, the process of the invention is carried out by introducing solvent, in this instance diesel oil, through inlet 46 into inner pipe 42. At the same time, drag reducer a high molecular weight alpha-olefin polymer, is pumped into the annulus between pipe 50 and 42 through entry 52. Inner pipe 42 contains a plurality of openings 44 which are equally spaced along the length of inner pipe 42 and around the outer surface thereof. Inner pipe 42 is wrapped with a very fine wire mesh. In this instance about 80 mesh. The drag reducer pumped into the annulus is forced by high pressure differential through the fine mesh in openings 44 and into the flowing stream of solvent. The polymer forced through the mesh forms fine filaments or threads which are also pulled by the flowing solvent. Because of the number of perforations and size of the mesh, thousands of fine threads of polymer enter the flowing solvent. The solvent passes through inner pipe 42 at a sufficient flow rate that the threads of polymer are wrapped around each other or woven so that the mixture of polymer and solvent leaving apparatus 40 is a woven matrix of fine polymer threads in the solvent.

In the first stage of the process as described, there may not be totally efficient formation of fine polymer threads. Thus, a small portion of the polymer may not form a thread as it passes through the fine wire mesh, either because it is not sufficiently wetted by the solvent or is not pulled by the solvent flow or because of other problems in the flow mechanism. These portions of polymer which do not thread will form small sized balls of polymer. The second stage of the process which is carried out in the shear strain apparatus provides a means to help pull or elongate these balls of polymer to reduce their number and to also help continue the mixing of the polymer threads and the solvent. The shear strain apparatus which is shown as 60 in FIG. 3 is a cylindrical vessel or pipe which is much larger in diameter than the inner pipe 42 of the preceding thread forming apparatus. As a result the velocity of the flowing solvent in 60 is much less than in the thread forming apparatus. Contained within pipe 62 are a number of cone-shaped metal strainers 68 with large flow areas. In this instance, about 3/64 inch openings which provide low velocities of solvent through the strainers to minimize any shear degradation of the polymers contained in the solvent. The mixture of solvent and polymer enters the shear strain apparatus through inlet 64 and passes through the strainers where the balls of polymer are extruded through the mesh and elongation shear forces help pull the polymer into long fibers. These elongation forces also increase contact between the solvent and the polymer threads by pulling on the threads and stretching them in the presence of the solvent.

The material leaving the second stage of the process through outlet 66 is a mixture of polymer threads and solvent plus a small amount of small sized polymer curds usually in the form of balls. A portion of the polymer threads has started to swell such that the polymers are mixing in with the solvent and the blend is becoming more viscous. However, a longer period of time than that provided in the shear strain apparatus is necessary for the polymer-solvent blend to fully gel. If the polymer-solvent mixture is stored before the blend has full gelled, separation between the polymer and solvent can occur since the solvent density is normally different than the density of the polymer. Once the blend of polymer and solvent has gelled, the viscosity of the blend is sufficient to keep the solvent and polymer from separating during storage.

To effect this result in the third stage of the process, the polymer is introduced to one of the holding vessels shown in FIGS. 4A, 4B and 4C. Each of these vessels is much larger than the apparatus of either of the preceding stages so that sufficient holding time for the polymer is provided to effect complete gelling of the polymer. In FIG. 4A, the holding tank 80 is simply a vertical vessel with the polymer solvent mixture being introduced to the bottom through inlet 82 and withdrawn after sufficient holding time through outlet 84. In FIG. 4B the holding tank 86 contains a series of baffles 92 whereby the solvent polymer mixture entering through inlet 88 is subjected to gentle agitation during the holding time and is ultimately removed from the holding tank through outlet 90. FIG. 4C represents a holding tank 94 which is a horizontal vessel which can be rotated in the direction shown at 100 by a suitable motor and belt apparatus or other suitable apparatus (not shown).

If the drag reducer polymer is to be injected into a hydrocarbon pipeline immediately following the shear strain portion of the process, then stage 3 i.e. the holding tank is not necessary. Also, if the solvent employed in the process is about the same density as the drag reducer, then stage 3 probably would not be necessary.

With reference to the inner pipe 42 of the filament or thread forming apparatus 40, the size of the openings in this pipe will vary from about 0.25 inches to about 1 inch in diameter depending on the size of the pipe. The screen which is wrapped around the pipe to cover these openings will vary from about 20 mesh to about 160 mesh and preferably will be from about 80 mesh to about 120 mesh. A substantial driving force is required to move the polymer through the annulus between the inner and outer pipe and through the wire mesh. Usually, this driving force will be from about 50 to about 500 psig.

As pointed out previously, the screen described above functions to divide the polymer passing therethrough into a large number of fine filaments or threads. While a screen is the simplest apparatus and is preferred, it is within the scope of the invention to use other means for finely dividing the flowing polymer into filaments or threads. For example, the same result may be obtained by providing a large number of very small holes in inner pipe 4 of FIG. 1 or inner pipe 42 of FIG. 2. Also, in place of a screen dies having multiple openings, such as those described in the patent literature, may be installed in holes 6 of inner pipe 4 of FIG. 1 or in openings 44 of inner pipe 42 of FIG. 2.

The cone strainers 68 in shear strain apparatus 60 have much larger passageways usually from about 1/32 inch to about 3/32 inch openings in order to reduce the possibility of any shear degradation of the polymer in the polymer-solvent mixture moving through the shear strain apparatus.

The flow area of the cone strainers is preferably greater than, up to 3 to 4 times as great as the flow area of the unobstructed portion of shear-strain apparatus. Thus, the flow rate of the polymer-solvent mixture through the cone strainers is preferably lower than the flow rate through the other portion of the shear-strain apparatus.

The flow rate of the solvent in the first stage of the process, that is in the filament or thread forming stage, will vary from about 0.1 to about 20 feet per second, and preferably from about 1 to about 5 feet per second. The shear strain apparatus of the second stage of the process is sized to provide a solvent containing drag reducer velocity from about 0.01 to about 0.5 feet per second and preferably from about 0.05 to about 0.10 feet per second. In any event, the velocity in this stage will be much lower than the velocity in the first stage of the process.

The velocity of the solvent polymer mixture in the holding vessel is so low as not to be significant. The holding time in this vessel usually varies from about 10 to about 60 minutes and preferably from about 15 to about 30 minutes. In any event, the holding time is such that the solvent-polymer blend has sufficient time to substantially complete gelling before exiting the holding vessel.

The apparatus and process of the invention have a number of advantages. For example, the drag reducer-solvent blend can be made on site using an available solvent source such as a slipstream off a pipeline or stored petroleum. Blends can be initiated and completed within 15 minutes or less from startup time. The process is continuous as compared to batch processes. The rate of blend production can be varied to meet demand. The total apparatus is compact, thus it would take up minimal space on an offshore platform.

The various parts of the apparatus of the invention, i.e. the filament forming apparatus, the shear strain apparatus, the holding tank, etc. are usually constructed of metals, such as steel or other metal alloys. It is also within the scope of the invention however to use other materials of construction, at least in part, such as glass and industrial plastics and polymers.

The following examples are presented in illustration of the invention.

EXAMPLE 1

A test was carried out using as a filament or thread forming apparatus similar to that shown in FIG. 2, comprising an inner 1 inch schedule 80 pipe and an outer 2 inch schedule 80 pipe, each pipe 4 feet in length. The 1 inch pipe contained sixty ¼ inch holes covered with 80 mesh wire. A polymeric drag reducer was introduced into the outer pipe at a rate of 0.4 gallons per minute and diesel oil solvent was introduced to the inner pipe at a rate of 6.6 gallons per minute. The drag reducer was a copolymer of hexene and dodecene having an inherent viscosity of 15.2 deciliters/gm.

The product leaving the filament or thread forming apparatus was a fairly homogenous solution. However, there were some "curds" (BB or larger sized pieces of nondispersed drag reducer). When picked up by hand, the polymer-solvent mixture was like a thin taffy and when allowed to thin out into a plane it was possible to observe interwoven threads of drag reducer, i.e. thousands of fine fibers more or less intertwined or woven together in a random pattern.

EXAMPLE 2

A shear strain apparatus, like that shown in FIG. 3 was added as stage 2 following the filament or thread forming apparatus of Example 1. The shear strain apparatus comprised 4 inch pipe, 8 feet long, containing 3 in line conical strainers spaced about 3 feet apart. The conical strainers were made up of 16 mesh wire. In this example the same drag reducer was used as in Example 1 and was introduced to the filament or thread forming apparatus at a rate of 0.4 gallons per minute. Diesel oil was again introduced at a rate of 6.6 gallons per minute.

The material leaving the shear strain apparatus was a fairly homogenous solution. Most of the curds were eliminated.

A 55 gallon drug was filled with the solvent polymer mixture leaving the unit. This mixture was allowed to set in the drum overnight. The drum was then sampled at various levels and the results showed that there was stratification, that is, the drag reducer tended to rise and increase the percentage of drag reducer in the mixture at the top of the drum. This accordingly, reduced the percentage of drag reducer in the diesel oil in the lower portion of the drum.

The drum was allowed to set for several days and was again checked for stratification. There was an indication of further stratification, but not much. Most of the stratification appeared to occur during the early hours after the blend was made.

EXAMPLE 3

The procedure of Example 2 was repeated except in this test, the drum was rolled after filling to provide mild agitation of the polymer solvent mixture. Rolling was carried out on a drum roller for 30 minutes. The drum contents were then poured into a storage vessel and allowed to set overnight. When examined, the solvent-polymer mixture showed little stratification, if any. It appeared that mixing following the shear-strain apparatus prevented the solvent polymer mixture from separating until there had been sufficient swelling and dissolution of the polymer fibers into the diesel oil.

Samples from the top and the bottom of the storage vessel were injected into a flowing stream of diesel oil to determine drag reduction performance and ascertain if any significant degradation of the drag reducer occurred in the blending apparatus. The top sample of the polymer-solvent mixture gave a 45 percent drag reduction and the bottom sample gave 43 percent drag reduction. Based on other tests with this drag reducer, the drag reduction expected was about 44 percent. It appears therefore that there was no significant degradation of the drag reducer in its passage through the test apparatus.

EXAMPLE 4

In a larger scale test, 900 gallons of a blend of jet fuel and drag reducer (about 12 percent drag reducer) was prepared in the apparatus employed in Example 2. The jet fuel flow rate was 3.5 gallons per minute and the drag reducer flow rate was 0.46 gallons per minute. The drag reducer used was a commercial drag reducer CDR 102 ® sold by Conoco Specialty Products, Inc., having an inherent viscosity of 15.3 deciliters/gm. After the unit was started up, 17 drums were filled with the products in succession. After each drum was filled, it was placed on a roller for about 20 minutes except for the last drum. The last drum was only rolled for 10 minutes and was allowed to sit for 3 days to test for stratification. The total run time was about 4 hours. Immediately after the run was completed samples were pulled from several of the drums and observed. Those drums which had been first filled (that is, had set for over 4 hours) had polymer-solvent mixtures which appeared to be fully gelled. The latest drums filled still showed some distinct phases of drag reducer fibers present. The phases lost distinction as the mixture age increased.

Samples taken from the 17th drum after 3 days of settling showed no apparent stratification. Two samples from the seventeenth drum were injected into diesel oil to test for drag reduction. One of these sample gave a drag reduction of 40.4 percent and the other 39.0 percent. Previous tests of the same drag reducer showed a drag reduction of 41.9 percent.

EXAMPLE 5

A KOCK SMX static mixer (2 inch, seven elements) was placed in line downstream of the apparatus of Example 2. The same drag reducer as in Example 4 was introduced at a rate of 0.43 gallons per minute to diesel oil flowing at a rate of 4 gallons per minute. The product leaving the static mixer was introduced to a drum which was allowed to set overnight. Some stratification did occur, however, much less than would have resulted without the static mixer. It appears therefore that the baffles in the static mixer significantly reduced the tendency for stratification.

Two samples from the drum were injected into flowing diesel oil to measure drag reduction. Sample 1 gave a drag reduction of 41.5 percent and Sample 2 gave a drag reduction of 41.2 percent. Previous tests of the same drag reducer provided a drag reduction of 41.9 percent. Indicating that there was no sign of degradation in the polymer-solvent mixtures prepared in this example.

EXAMPLE 6

The filament and thread forming apparatus and shear strain apparatus used in Example 2 were also used in this example. A 75 gallon vertical vessel was placed downstream to serve as a residence vessel to give the polymer-solvent mixture sufficient time to gel in order to prevent stratification. The drag reducer which was introduced at a rate of 0.44 gallons per minute was blended with diesel fuel at a rate of 3.9–4.0 gallons per minute. The same drag reducer was used as in Example 4.

The unit was started up and operation was continued until sufficient material had passed through the 75 gallon vertical vessel to fill two drums with polymer solvent blend. The two drums were allowed to set overnight and showed no apparent stratification. Thus, the unbaffled residence vessel also eliminated the stratification problem. Under the conditions of the test the residence time in the 75 gallon vertical vessel was about 17 minutes. This was sufficient time to allow the polymer-solvent mixture to properly swell and gel to the point where the undissolved fibers and diesel would not separate under gravitational forces.

EXAMPLE 7

A different apparatus was used in this test. The filament or thread forming portion of the unit was made up of 1.5 inch schedule 160 and 0.5 inch schedule 80 pipe with 160 ¼ inch holes in the perforated section covered with 80 mesh wire. The stress strain apparatus was made up of 2 inch piping containing three conical strainers which were made of perforated metal plate with 3/64 inch holes.

An 8½ gallon vertical (unbaffled) residence vessel was installed downstream of the described apparatus. The purpose of this vessel was to reduce or eliminate stratification of the polymer-solvent mixtures. The drag reducer of Example 4 at rates ranging from 0.04 to 0.11 gallons per minute was combined with diesel oil at a rate of 0.4 gallons per minute. During the runs, samples of blends at various drag reducer concentrations were obtained in 5 gallon buckets and allowed to set overnight. Two blends were obtained with 9 percent drag reducer, 2 blends with 13.5 percent drag reducer and one blend with 21.5 percent drag reducer. In all of the bucket samples after setting overnight, the blends were homogeneous with no apparent stratification.

While certain embodiments and details have been shown for the purpose of illustrating the present invention, it will be apparent to those skilled in the art that various changes and modifications may be made herein without departing from the spirit or scope of the invention.

I claim:

1. A process for blending a viscous polymer in a solvent which comprises:
   (a) introducing solvent into one end of an first elongated zone containing a plurality of openings along the length of such zone, each opening containing a plurality of small passageways,
   (b) introducing viscous polymer into a second elongated zone surrounding and spaced from the first elongated zone to form an annulus, said second zone being sealed to the first elongated zone at each end thereof, whereby said viscous polymer passes from the second zone into the first zone through the small passageways and enters the solvent in the first zone in the form of filaments or thread,
   (c) removing solvent containing viscous polymer from the other end of the first elongated zone,
   (d) introducing said solvent containing viscous polymer to one end of a third elongated zone of larger cross-section than the first zone containing several flow obstructions spaced along the length of such zone, each flow obstruction having a plurality of passageways of larger cross-section than the passageways of the openings in the first zone, whereby viscous polymer which does not form filaments or threads when passing from the second zone into the first zone, is extruded through the passageways in the flow obstructions to form long fibers of drag reducer and the filaments and threads of polymer and solvent are thoroughly blended,
   (e) removing solvent containing viscous polymer from the other end of the third zone, and
   (f) introducing said solvent containing viscous polymer into a fourth zone wherein the viscous polymer contained in the solvent has sufficient residence time to gel.

2. The process of claim 1 in which the solvent containing viscous polymer has a composition of from about 1% to about 50% drag reducer by weight.

3. The process of claim 2 in which the velocity of the solvent containing viscous polymer in the first zone is between about 0.1 and about 20 ft/sec.

4. The process of claim 2 in which the passageways in the first zone vary in size from about 20 mesh to about 160 mesh.

5. The process of claim 2 in which the velocity of the solvent containing viscous polymer in the third zone is between about 0.01 and about 0.5 ft/sec.

6. The process of claim 2 in which the residence time of the solvent containing viscous polymer in the fourth zone is between about 10 and about 60 minutes.

7. The process of claim 1 in which the velocity of the solvent containing drag reducer in the first zone is between about 1 and about 5 ft/sec and the velocity of the solvent containing viscous polymer in the third zone is between about 0.05 and about 0.10 ft/sec.

8. The process of claim 7 in which the passageways in the first zone vary in size from about 80 mesh to about 120 mesh and the passageways in the third zone vary in size from about 1/32 inch to about 3/32 inch openings.

9. The process of claim 8 in which the viscous polymer is forced through the passageways in the first zone by a differential pressure between about 50 and about 500 psig.

10. A process for blending a viscous polymer in a solvent which comprises:
    (a) introducing solvent into one end of an first elongated zone containing a plurality of openings along the length of such zone, each opening containing a plurality of small passageways,
    (b) introducing viscous polymer into a second elongated zone surrounding and spaced from the first elongated zone to form an annulus, said second zone being sealed to the first elongated zone at each end thereof, whereby said viscous polymer passes from the second zone into the first zone through the small passageways and enters the solvent in the first zone in the form of filaments or threads,
    (c) removing solvent containing viscous polymer from the other end of the first elongated zone,
    (d) introducing said solvent containing viscous polymer to one end of a third elongated zone of larger cross-section than the first zone containing several flow obstructions spaced along the length of such zone, each flow obstruction having a plurality of passageways of larger cross-section than the passageways of the openings in the first zone, whereby viscous polymer which does not form filaments or threads when passing from the second zone into the first zone, is extruded through the passageways in the flow obstructions to form long fibers of drag reducer and the filaments and threads of polymer and solvent are thoroughly blended and
    (e) removing solvent containing viscous polymer from the other end of the third zone, and
    (f) injecting the solvent containing viscous polymer into a flowing stream of hydrocarbon liquid.

11. The process of claim 10 in which the solvent containing viscous polymer has a composition of from about 1% to about 50% drag reducer by weight.

12. The process of claim 11 in which the velocity of the solvent containing viscous polymer in the first zone is between about 0.1 and about 20 ft/sec.

13. The process of claim 11 in which the passageways in the first zone vary in size from about 20 mesh to about 160 mesh.

14. The process of claim 11 in which the velocity of the solvent containing viscous polymer in the third zone is between about 0.01 and about 0.5 ft/sec.

15. The process of claim 10 in which the velocity of the solvent containing drag reducer in the first zone is between about 1 and about 5 ft/sec, the velocity of the solvent containing viscous polymer in the third zone is between about 0.05 and about 0.10 ft/sec and the residence time of the solvent containing viscous polymer in the fourth zone is between about 10 and 60 minutes.

16. The process of claim 15 in which the passageways in the first zone vary in size from about 80 mesh to about 120 mesh and the passageways in the third zone vary in size from about 1/32 inch to about 3/32 inch openings.

17. The process of claim 16 in which the viscous polymer is forced through the passageway in the first zone by a differential pressure between about 50 and about 500 psig.

* * * * *